UNITED STATES PATENT OFFICE.

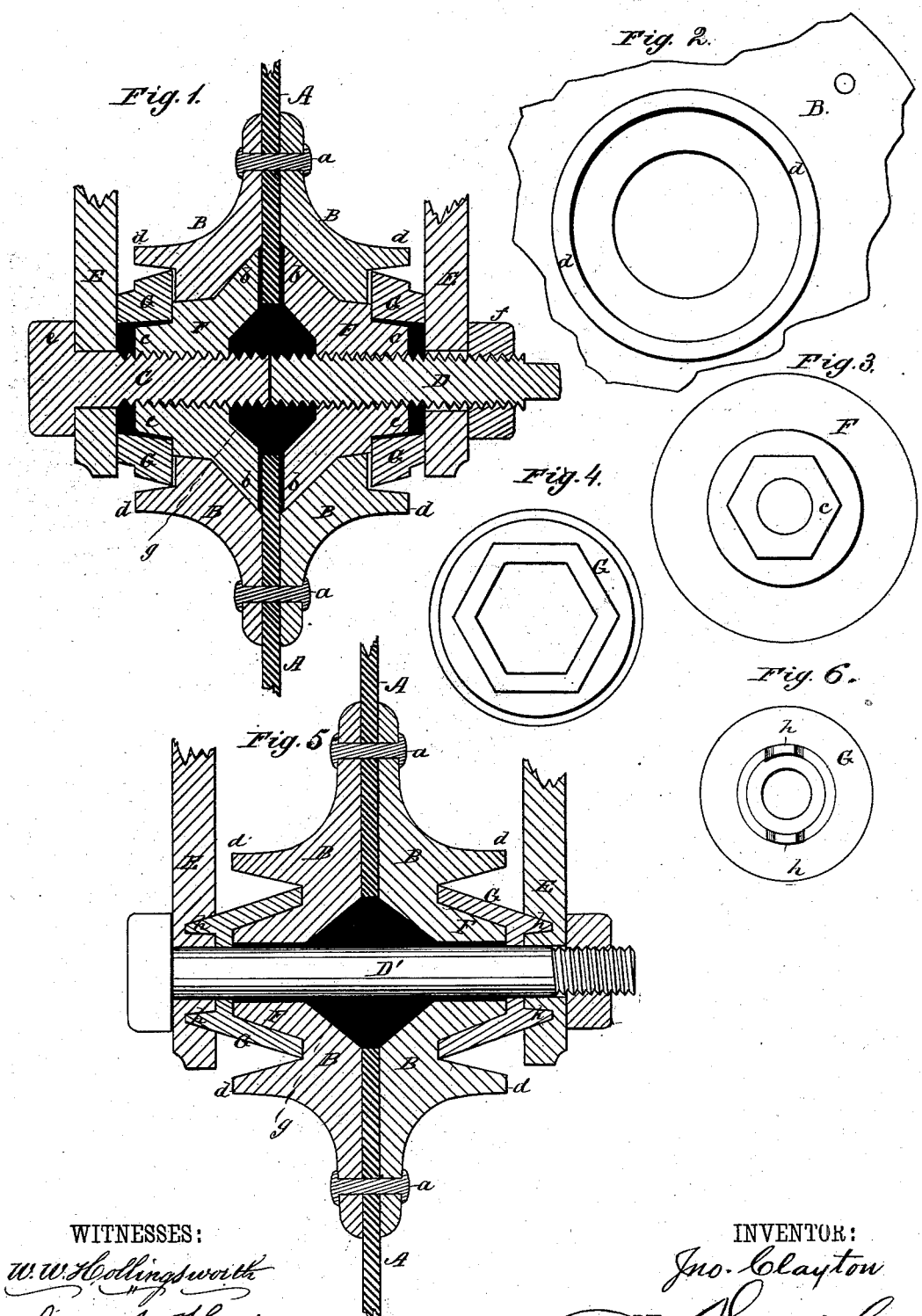

JOHN CLAYTON, OF BRAINERD, MINNESOTA, ASSIGNOR TO MARY ANN CLAYTON, OF SAME PLACE.

COLTER.

SPECIFICATION forming part of Letters Patent No. 229,381, dated June 29, 1880.

Application filed February 7, 1880.

*To all whom it may concern:*

Be it known that I, JOHN CLAYTON, of Brainerd, in the county of Crow Wing and State of Minnesota, have invented a new and useful Improvement in Colters; and I do hereby declare that the following is a full, clear, and exact description of the same.

My invention is an improvement in the class of rolling colters, and has for its chief object to exclude dust and dirt from the friction-surfaces, thereby preventing wear of the journals, so that the durability and efficiency of the colter, as a whole, are increased. I also provide for taking up such frictional wear as is unavoidably incident to use, and for supplying lubricant to the friction-surfaces, all as hereinafter described.

In accompanying drawings, forming part of this specification, Figure 1 is a vertical central transverse section of one form of my improved colter. Figs. 2, 3, 4 are plan or face views of parts of the colter-clamping devices detached. Fig. 5 is a vertical section of a modified form of colter. Fig. 6 is a conical detachable washer of the latter.

Referring to Figs. 1, 2, 3, 4, the annular colter-plate A is clamped by short screw-bolts or rivets *a* between the two parts or sections B B of the hub. The screw C and the set-screw D pass through the arms E of the double hanger attached to the plow-beam, (not shown,) and screw into the journals F, which have a flared or beveled portion, *b*, that fits in a corresponding recess in the inner sides of the hub-sections B B. The outer reduced ends, *c*, of the journals F are made polygonal to prevent them from turning in the washers G, which have a recess of like shape to adapt them to fit on the journal ends *c*. The edge of the washers G is circular and concentric with the annular flange *d* of hub-sections B, which surround the washers.

The arms E of the hanger are clamped between the washers G and the head *e* and nut *f* of the journal-screws C D, and the journals proper are clamped firmly against the washers, as shown, and as these parts cannot move on each other, there is, of course, no friction and wear between them.

The movable or revolving parts are the colter proper, A, and hub-sections B B; hence the wear is wholly on the latter and the surfaces of the journals F and washers G, with which they rotate in contact. The washers break joints with the hub-sections B B, and thus exclude dust, (as much as practicable with so simple a construction of parts,) while the annular flanges of the hub-sections prevent dirt, sand, &c., falling into the spaces around the washers while the colter is at work.

Whenever the friction-surfaces of the journals, hub-sections B, and washers G have become worn so as to require it, they may be adjusted in closer contact by turning the screws C D. The set-screw D is, however, provided with a left-hand thread and the screw C with a right-hand one. The inner ends of the screws C D project into the central cavity, *g*, formed by the concavities in the inner sides of the hub-sections. This cavity serves as a reservoir for oil or other lubricant, and may be supplied therewith by removing the set-screw and inserting the nozzle of the filler in the hole previously filled by the screw.

In the modification shown in Figs. 5 and 6 but one screw, D, is employed, and the sections B and journals F are constructed in one piece. The washers G also have conical bodies, which fit over the correspondingly-shaped ends of the journals F, and are provided with spurs or teeth *h* on their outer ends that enter notches or holes in the hangers E, so that the washers are prevented from turning as the colter A rotates.

What I claim is—

1. The combination, with the rotating colter A and sections B, the latter having the annular projections *d*, of the fixed tapered non-rotating journals F and the fixed non-rotating washers G, whose inner ends abut the vertical shoulders of said journals and sections, all as shown and described, for the purpose specified.

2. In a rotary plow-colter, the combination of the washers G with the journals F, having tapered outer ends, on which the washers are fitted, and the hub-sections B B, having projecting flanges *d d*, said washers being arranged to break joints with the other parts, as shown and described, for the purpose specified.

JOHN CLAYTON.

Witnesses:
THOMAS A. BANNING,
A. B. GRAHAM.